United States Patent [19]

Carmi et al.

[11] 4,032,317
[45] June 28, 1977

[54] GLASS FORMING MOLD AND TEMPERATURE CONTROL APPARATUS THEREFOR

[75] Inventors: Arieh Carmi, Big Flats; Richard A. Potter, Horseheads; Alan G. Ryder, Elmira, all of N.Y.

[73] Assignee: Corning Glass Works, Corning, N.Y.

[22] Filed: Nov. 15, 1976

[21] Appl. No.: 742,286

[52] U.S. Cl. .................................. 65/161; 65/162; 65/319; 251/31
[51] Int. Cl.² .......................................... C03B 11/12
[58] Field of Search ............... 65/319, 161, 162; 251/31

[56] References Cited
UNITED STATES PATENTS

| | | | |
|---|---|---|---|
| 3,598,558 | 8/1971 | Ayers | 65/161 |
| 3,615,330 | 10/1971 | Jones | 65/161 |
| 3,630,707 | 12/1971 | Ayres | 65/319 X |

Primary Examiner—Robert L. Lindsay, Jr.
Attorney, Agent, or Firm—Charles W. Gregg; Burton R. Turner; Clarence R. Patty, Jr.

[57] ABSTRACT

An apparatus assembly for distributing and adjusting flow of cooling fluid to control the temperature of a glass forming mold used for forming generally funnel-shaped articles such as, for example, funnel members for glass television picture tube envelopes, the assembly including a cooling fluid distributor in the form of an orifice member or perforate baffle and a plurality of adjustable valves for selectively adjusting and directing the flow of the cooling fluid to and about different parts of the outer surface of the forming mold for selective temperature control of the mold during the forming of glass articles therein.

8 Claims, 7 Drawing Figures

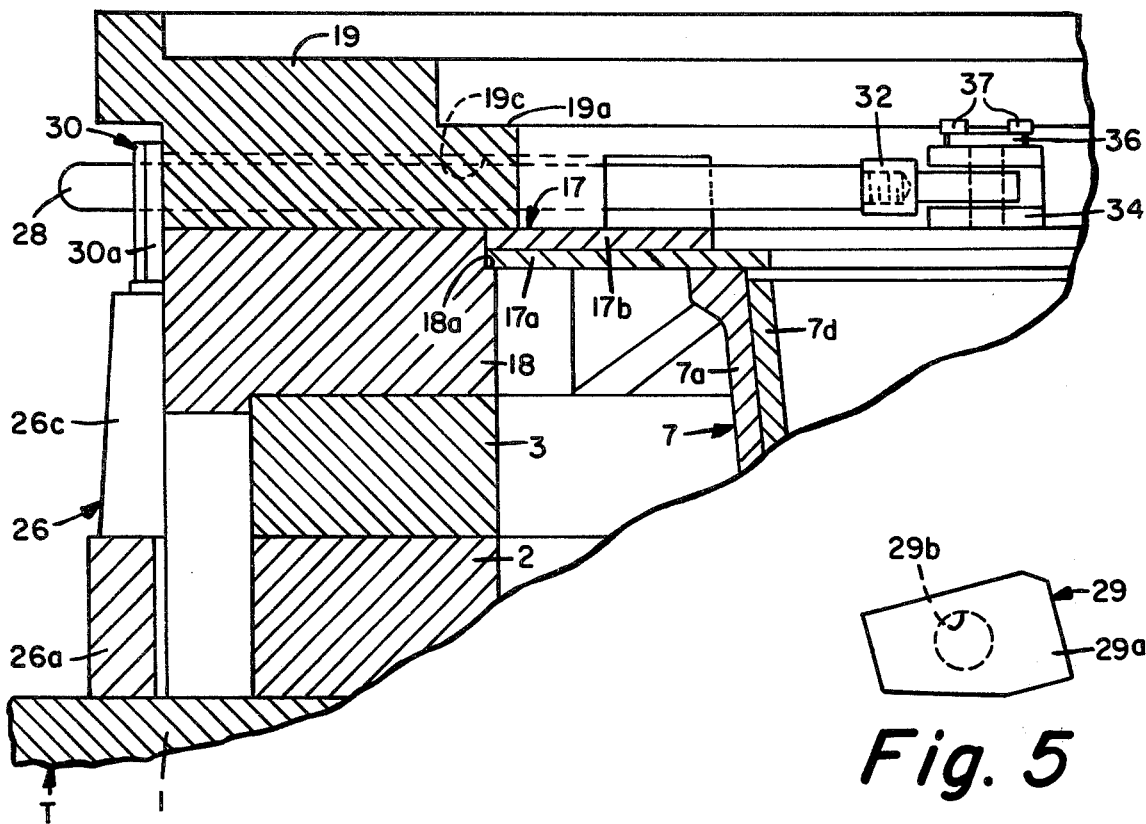
Fig. 3
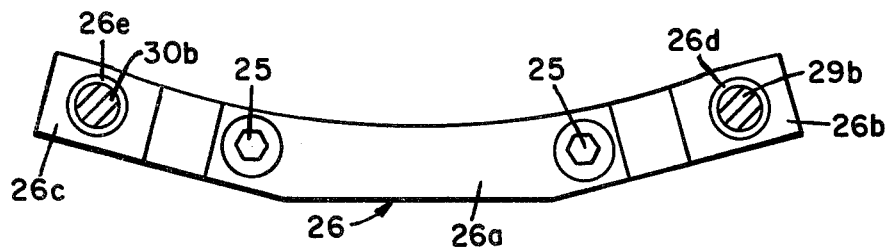
Fig. 5
Fig. 6
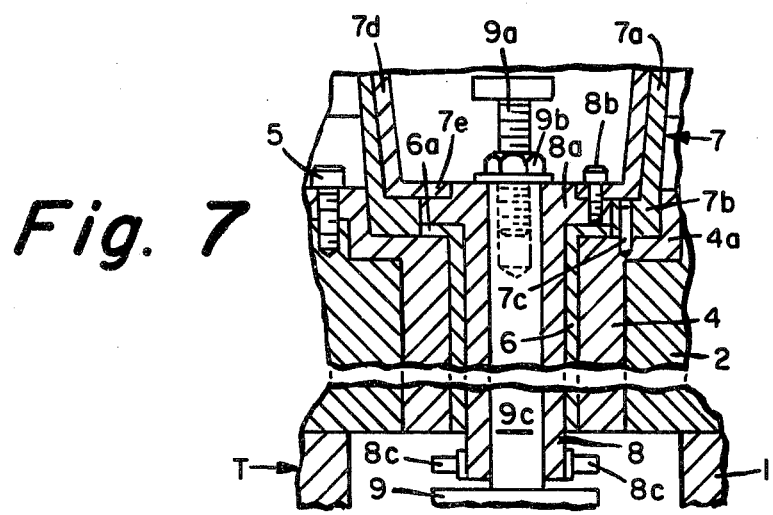
Fig. 7

GLASS FORMING MOLD AND TEMPERATURE CONTROL APPARATUS THEREFOR

BACKGROUND OF THE INVENTION

Currently glass forming molds are cooled by supplying thereto a flow of cooling fluid such as water or compressed air from a single source, such flow being controlled by adjusting a manual or automatic valve to attain the required flow and resultant cooling and, thereby, the desired mold temperature. In glass forming operations using some types of molds, such as molds used for press-forming funnel members for glass television picture tube envelopes for example, some portions, regions or zones of such molds may require substantially more or less cooling than other portions, regions or zones thereof in order to attain different desired temperatures for such zones, portions or regions. Such selective cooling by fluid flow from a single source of cooling fluid has, insofar as is known, not heretofore been satisfactorily accomplished. Accordingly, it is an object of the present invention to provide a glass forming mold of the type mentioned and an associated apparatus assembly for selectively cooling and, thereby, selectively controlling the temperatures of different portions, zones or regions of the glass forming mold.

It is another object of the present invention to provide an apparatus for differentially cooling and, thereby, controlling different temperatures in various portions, regions or zones of a glass forming mold.

Other objects and characteristic features of the invention will become apparent as the description proceeds.

SUMMARY OF THE INVENTION

The invention is believed to be adequately summarized in the foregoing abstract of the disclosure and, therefore, to avoid repetition or redundancy and for the sake of brevity to the extent possible, no further summary of the invention will be given nor is any believed necessary.

BRIEF DESCRIPTION OF THE DRAWINGS

FIG. 3 is a cross-sectional view taken generally along line 3—3 of FIG. 2;

FIG. 5 is a top plan view of a part of the apparatus shown in FIG. 4, such view being taken generally along line 5—5 of FIG. 4;

FIG. 6 is a top plan view of another part of the apparatus shown in FIG. 4, such view being taken generally along line 6—6 of FIG. 4; and FIG. 7 is a fragmentary cross-sectional view of the lower portion of the apparatus of FIG. 1.

Similar reference characters refer to similar parts in each of the figures of the drawings.

PREFERRED EMBODIMENTS OF THE INVENTION

Figure 1:
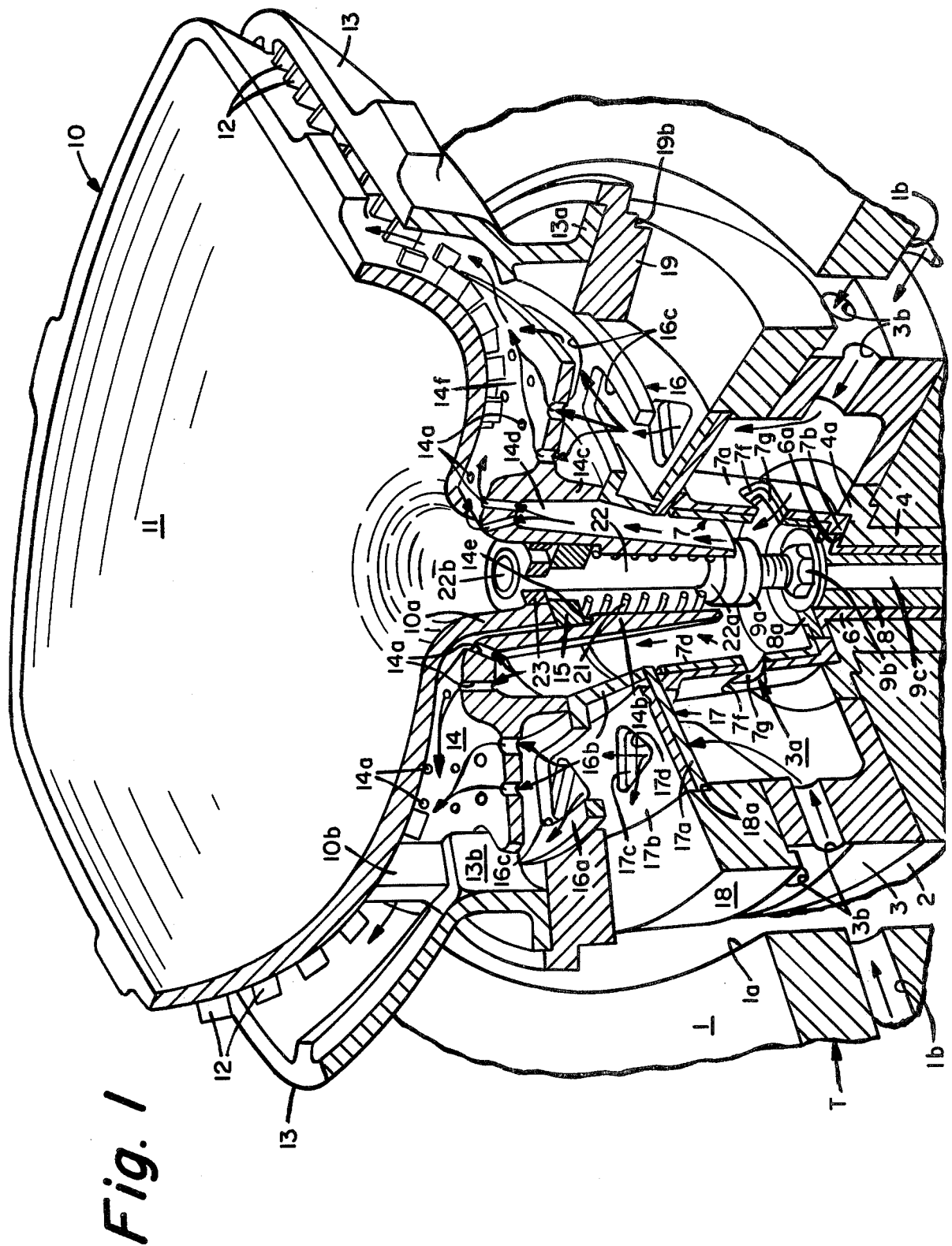
FIG. 1 is a somewhat isometric view of a glass forming mold and an associated cooling fluid flow distributing assembly embodying the invention and with part of such apparatus being broken away to illustrate details of internal structure of the apparatus.

Referring to the drawings in detail, there is shown in FIG. 1 an upper section 1 of a turret type glass pressing machine T of a conventional construction, such section embodying a relatively large hole 1a extending vertically therethrough and a plurality of horizontally extending holes such as 1b which open through the section 1 circular wall which defines the outer limits of said large hole 1a. The holes such as 1b are employed for supplying a flow of cooling fluid, such as water or compressed air for example, to the apparatus of the present invention as hereinafter described, and the plurality of such holes are preferably evenly spaced apart about said circular wall defining the outer limits of large hole 1a. However, only two of such holes 1b appear in FIG. 1.

There is disposed within said hole 1a is section 1 and spaced from said circular wall thereof an annular apparatus support member 2 which supports on the upper surface thereof a generally annular cooling fluid receiving and guide member 3 providing a plenum chamber 3a into which said cooling fluid flows through a plurality of horizontally extending holes such as 3b corresponding to said holes 1b in turret machine section 1. The bottom of member 3 is provided with a center hole which is of a smaller diameter than plenum chamber 3a but of a larger diameter than that of the center hole in annular support member 2 and a first sleeve or spacer member 4 having an upper flared portion 4a is snugly fitted in said center hole in member 2 with said flared portion 4a snugly fitting in said center hole in member 3. (See also FIG. 7.) Sleeve member 4 is secured to member 2 by one or more bolts such as 5 extending through said flange portion 4a and screwed into one or more suitably threaded holes in support member 2 as shown in FIG. 7.

A sleeve bearing 6 fits snugly within the center hole of sleeve or spacer member 4 and the upper end of such sleeve member 6 has a flare 6a which extends over part of the shoulder provided by the upper flared portion 4a of sleeve or spacer member 4. An annular lower end 7b of an outer member 7a of a so-called basket type fluid flow control valve 7, to be hereinafter further discussed, rests upon the remainder of said shoulder provided by the upper flared portion 4a of first sleeve 4 and fits snugly between the periphery of flare 6a of sleeve 6 and the wall defining the outer limits of the large opening provided in the upper flared portion 4a of sleeve 4. One or more locating pins such as 7c (FIG. 7) are provided in lower end 7b of member 7a of valve 7 and extend snugly into one or more cooperative holes provided in flared portion 4a of sleeve 4, such pin or pins also preventing rotation of member 7a of valve 7.

A third sleeve or bearing member 8 extends through sleeve 6 and such sleeve 8 also has a flared upper portion 8a to which there is secured, as by one or more bolts such as 8b (FIG. 7) an annular lower part 7e of an inner member 7d of valve 7, the bolts such as 8b being screwed into suitably threaded holes in flared upper portion 8a of sleeve 8. Inner member 7d of valve 7 fits relatively snugly but rotatable in the inside of outer member 7a of valve 7 and rotation imparted to sleeve 8 will impart rotation to said inner member 7d, such rotation being imparted to sleeve 8 by actuation of a pair of oppositely disposed projections or actuating protrusions such as 8c secured in any convenient manner to the outer periphery of sleeve 8 adjacent the lower end thereof, such actuation of said projections or protrusions being discussed hereinafter. There snugly but movably extends through the hollow of sleeve 8 a piston rod 9c of a pressurized fluid cylinder 9 (FIG. 7). A bolt 9a is screwed into a suitably threaded hole provided in the free or upper end of piston rod 9 and the height to which the top of the head of such bolt extends above the upper end of piston rod 9 may be adjusted, for purposes hereinafter discussed, by screwing the bolt further into or out said hole in the upper end of rod 9 and securing it in the selected position by a lock nut 9b.

There is further shown in FIG. 1 a glass forming mold 10 having a mold cavity 11 in which substantially funnel-shaped glass articles such as, for example, glass funnel members for television picture tubes are intended to be press-formed as is well known in the glass making art. The outer surface of mold 10 is provided with a quantity or multitude of cooling fins such as 12 which extend outwardly from said outer surface generally normal thereto and there surrounds mold 10, adjacent the upper portion or part of the upper bowl-shaped portion or part thereof, a cooling fluid enclosure or first member 13 which is similar in shape to said upper portion of mold 10 but is of a size such that the inner surface thereof is somewhat spaced from the outer ends of said cooling fins such as 12. Enclosure 13 includes a lower foot portion 13a whose bottom surface rests on the upper rimmed surface of an annular spacer member 19 whose lower surface rests on the upper surface of a relatively thick annular support member 18 to be discussed hereinafter. Enclosure 13 further includes about its inner surface a plurality of at least three mold supporting bosses or pads such as 13b equally spaced apart about such surface and only one of which appears in FIG. 1 of the drawings. Such pads or bosses are cooperative with an equal number of downwardly extending bosses or short pedestals such as 10b provided on and about the lower surface of mold 10 with equal spacing therebetween and only one of which appears in FIG. 1. The lower surfaces of each of the bosses or pedestals such as 10b rest on the upper surface of a corresponding one of said pads or bosses such as 13b provided on the inner surface of enclosure 13 and it will be understood that a bolt (not shown) extends upwardly through each boss such as 13b and is screwed into cooperative threads provided in a hole in the corresponding pedestal such as 10b. Mold 10 is thus positioned in and supported by enclosure 13.

There is disposed below the lower portion or part of the upper or bowl-shaped part or portion of mold 10 a perforate baffle or orifice member 14 embodying a quantity or multitude of perforations or orifices such as 14a extending therethrough, a main outer plate portion 14f of such member being shaped so as to be spaced from the lower ends of the cooling fins such as 12 where such fins are provided on said lower portion of the bowl-shaped part of mold 10. Where such cooling fins are not provided on said lower portion, orifice member or baffle 14 curves upwardly into close proximity to the lower surface of such lower portion but spaced therefrom. Orifice or perforate member 14 further includes a central lower portion 14b having somewhat the shape of an inverted hollow truncated cone of a substantial height, the upper part of such lower member portion 14b surrounding an extreme lower or somewhat tubular part or portion 10a of mold 10 in a spaced relationship from the outer surface of such tubular part of the mold. The lower part of said central lower portion 14b of perforated baffle or orifice member 14 extends downwardly into the hollow of previously mentioned basket valve 7.

There is embodied at about half way down the inner wall of said central lower portion 14b of member 14, an annular ledge 14e. A part of the lower surface of a relatively large washer or annulus 15, adjacent the outer periphery of such annulus, rests on said ledge 14e with such outer periphery fitting relatively snugly within the hollow of said central portion of member or baffle 14. The lower surface of tubular part 10a of mold 10 rests on the upper surface of washer or annulus 15 and the upper end of a compressible coil spring 21 bears against the lower surface of annulus 15 with the lower end of such spring bearing against a shoulder provided by a lowered flared end 22a of a push-out rod 22 which extends downwardly through the turns of coil spring 21 with the lower surface of the lower flared end 22a of rod 22 bearing against the upper surface of the head of previously discussed bolt 9a provided on the upper end of piston rod 9c of cylinder 9. The upper end 22b of rod 22 is also flared and the lower surface of such flare end bears against the upper surface of a washer 23 surrounding rod 22. The lower surface of washer 23 rests on part of the upper surface of the aforesaid annulus 15 adjacent the inner periphery of such annulus. By such arrangement, the actuation of piston rod 9c of cylinder 9 in an upward direction, by supplying pressurized fluid to the lower end of cylinder 9 in a well known manner, will correspondingly actuate push-out rod 22 upwardly against the force of spring 21 thereby compressing such spring while pushing upward on the lower or tubular stub end of a funnel-shaped article formed in cavity 11 of mold 10 to aid in removal of such article from such cavity. When the supply of pressurized fluid to said lower end of cylinder 9 is terminated, the force of spring 21 will push down on rod 22 and return such rod to its position shown in FIG. 1, that is, to a retracted position within cylinder 9. Such article push-out arrangements are well known to those skilled in the art. Adjustable bolt 9a on the end of piston rod 9c allows for adjustment for wear of the upper surface of the head of bolt 9a and the lower surface of flared end 22a of push-out rod 22.

Orifice or perforated baffle or member 14 further includes a downwardly extending annular portion 14c having a larger diameter than said central portion 14b of such member and surrounding such central portion to provide therewith a second annular plenum chamber 14d which is provided for supplying cooling fluid to the orifices such as 14a embodied in the previously mentioned greater height portion of orifice member 14. The lower rim of portion 14c of perforated baffle member 14 rests on the upper surface of a horizontally extending and windowed annular portion 16a of a support member 16 which also includes an annular downwardly extending portion 16b whose lower rim rests on the upper surface of a flat lower annular member 17a of a plate-type cooling fluid flow control valve 17 adjacent the inner periphery of such lower member 17a. Valve 17 will be discussed hereinafter. Said lower rim of portion 14c of member 14 rests on the upper surface of said horizontally extending portion 16a of support member 16 adjacent the inner periphery of such support member. Annular portion 16a of member 16 is provided with a plurality of relatively large windows such as 16c which are preferably evenly spaced apart from each other about the circular distance of portion 16a and extend through such portion to provide for passing of cooling fluid therethrough and thence to the bottom ends of the orifices such as 14a embodied in the horizontally extending portion of perforate or orifice member 14.

Lower annular member 17a of the aforesaid plate-type valve 17 rests, adjacent its inner periphery, on the upper rim of outer member 7a of basket-type valve 7 and, adjacent the outer periphery of such member 17a, on a ledge 18a provided on the inner periphery of previously mentioned annular support member 18 and extending about such inner periphery of member 18. (See also FIG. 3.) Valve 17 further includes an upper flat annular member 17b whose lower surface rests on the upper surface of lower member 17a of the valve, such member 17b being slidably movable about said upper surface, as discussed hereinafter in conjunction with FIG. 2, to control or adjust the amount of flow of cooling fluid through triangularly shaped openings or holes such as 17c and 17d provided in members 17a and 17b, respectively, of valve 17. The lower surface of the aforesaid support member 18 rests on the upper surface of previously discussed member 3 while the outer part of the lower surface of windowed annular portion 16a of member 16, previously discussed, rests on the upper surface of an annular ledge 19a (FIG. 3) provided about the inner periphery of annular spacer member 19, previously mentioned.

Figure 4:
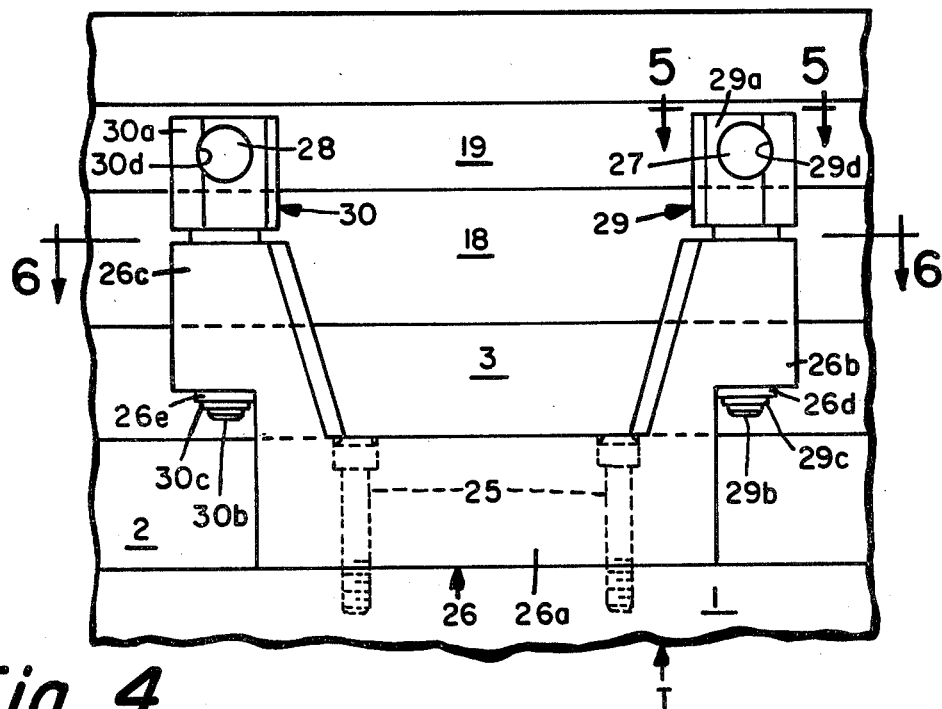
FIG. 4 is an elevational view of the part of the apparatus shown in FIG. 2, such view being taken generally along line 4—4 of FIG. 2.

Referring now to FIGS. 2 through 6 of the drawings, there is shown a support and guide member 26 for a pair of rods 27 and 28 for actuating or rotating upper plate member or plate 17b of plate valve 17, such support and guide member being supported by a base portion 26a which is secured, as by bolts such as 25, to an upper surface of previously mentioned turret machine T, such bolts extending downwardly through said base portion 26a of member 26 and being screwed into suitably threaded holes provided in turret machine T as shown in FIG. 4. Support and guide member 26 also includes upper and outwardly extending portions 26b and 26c, embodying sleeve type or cylindrical bearings 26d and 26e, respectively, extending vertically therethrough.

Figure 2:
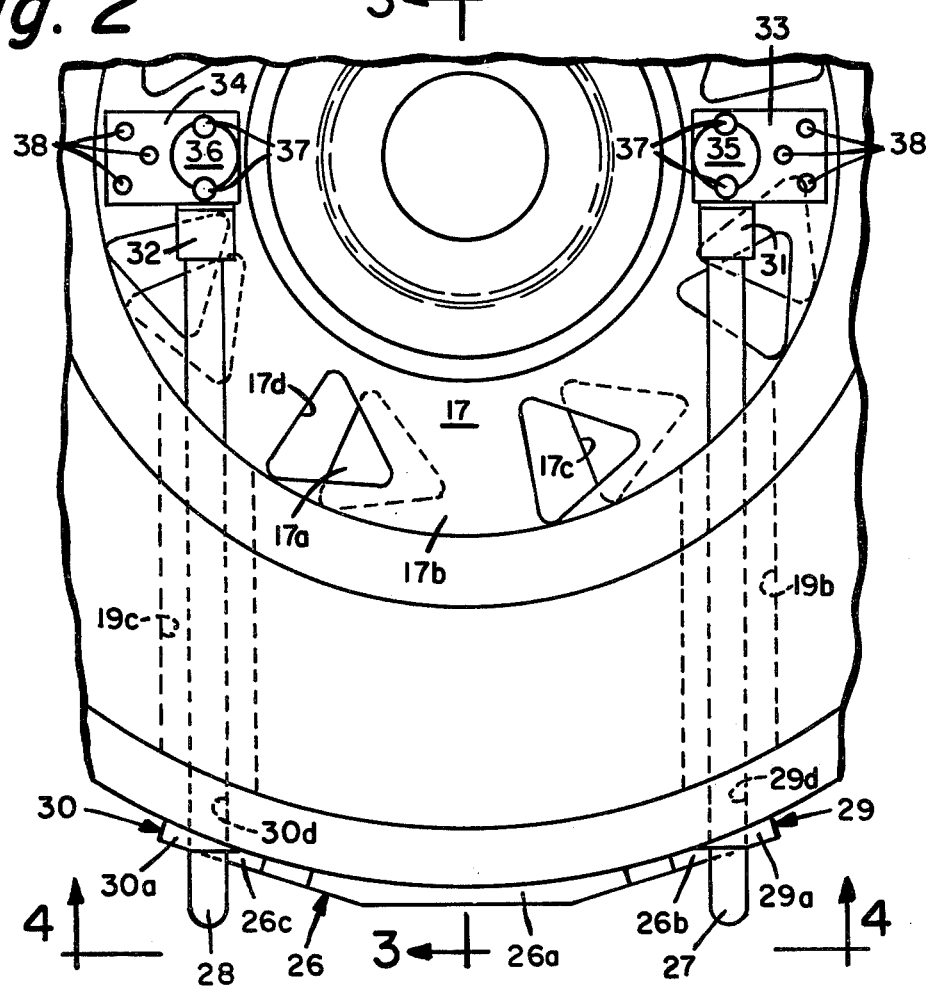
FIG. 2 is a top plan fragmentary view of part of the apparatus of FIG. 1.

A first or right hand actuator rod pivot device 29 includes a head portion 29a (FIGS. 4 and 5) and a pivot pin 29b which extends downwardly through the hole in sleeve bearing 26d in portion 26b of support 26 and is secured therein by a substantially semi-circular washer 29c (FIG. 4) which is snapped into a cooperative groove provided adjacent the bottom end of pivot pin 29b and extending thereabout. Such arrangements are well known. Pivot device 29 further includes a horizontal hole 29d through which a first or the free end of actuator rod 27 extends snugly but slidably as best shown in FIG. 2. A second or left hand actuator rod pivot device 30 which is a mirror image of said pivot device 29 is provided and such device 30 includes portions or parts 30a through 30d which correspond respectively to parts 29a through 29d of pivot device 29. Pivot pin 30b of device 30 extends downwardly through the hole in sleeve 26e and a first or the free end of actuator rod 28 extends snugly but slidably through hole 30d in head portion 30a of device 30.

Actuator rods 27 and 28 also extend through relatively wide channels 19b and 19c, respectively, provided in the bottom of annular spacer member 19 and extending through such member in directions shown in FIG. 2. (See also part of channel 19b shown in FIG. 1 and channel 19c shown by dotted lines in FIG. 3.) The second ends of rods 27 and 28 have attached thereto, as by being screwed onto suitable threads provided on said second ends of the rods, first ends of pivotal members 31 and 32 having second relatively flat ends embodying holes extending therethrough for pivotal attachment of such members to or between the forked end portions of a pair of clevises 33 and 34, respectively, as by large headed pivot pins 35 and 36, respectively, extending downwardly through suitable holes provided in said forked end portions and through said holes in said flat ends of said pivotal members 31 and 32, said pivot pins each being retained in the holes in their respective clevises by a pair of screws such as 37 which extend downwardly through semi-circular holes provided in the edges of the heads of said pivot pins are then screwed into cooperatively threaded holes provided in the forked ends of the clevises.

Clevises 33 and 34 are secured to upper plate member or plate 17b of plate valve 17 diametrically opposite each other across the center of the center hole in such plate member as shown in FIG. 2, such attachment of the clevises being by screws such as 38 extending upwardly through holes countersunk in the bottom of plate member 17b and extending upwardly therethrough into suitably threaded holes provided in the second or non-forked ends of the clevises. By the actuator rod arrangement just described, and when said openings or windows 17c and 17d in valve 17 are partially open as shown in FIG. 2, actuation of rod 27 by pushing against said first or free end thereof, will cause plate 17b to be rotated in a counterclockwise direction (viewing FIG. 2) to bring triangular holes or windows 17c and 17d in plates 17a and 17b, respectively, more in alignment with each other to further open valve 17 to allow for an increased flow, that is, an increased quantity or rate of flow of a cooling fluid therethrough when so desired. Conversely, when rod 28 is actuated by pushing against said first or free end of that rod, plate 17b will be rotated in a clockwise direction (viewing FIG. 2) to move said holes or openings 17c and 17d more out of alignment with each other to further close valve 17 and attain a decreased flow, that is, a decreased quantity or rate of flow of a cooling fluid therethrough when so desired. That will be further mentioned hereinafter.

Returning now to FIGS. 1 and 7, and basket valve 7 previously discussed, outer and inner members 7a and 7d of basket valve 7 embody, in the upwardly extending walls thereof, a plurality of pairs of cooperative and triangularly shaped openings or windows such as 7f and 7g (FIG. 1) respectively, which may be moved further into or out of alignment with each other to attain increased or decreased flow, that is, increased or decreased quantities or rates of flow of cooling liquid through basket valve 7 in a manner similar to that discussed in conjunction with plate valve 17. When said windows 7f and 7g are fully aligned with each other as shown in FIG. 1, basket valve 7 may be regulated or adjusted by pushing against the right hand projection 8c on the lower end of sleeve (FIG. 7) to rotate member 7d of the valve in a counterclockwise direction (viewing FIG. 1) to decrease said flow of cooling fluid through valve 7. However, if said windows 7f and 7g are partially or fully out of alignment with each other, basket valve 7 may be regulated or adjusted by pushing against the left hand projection 8c on the lower end of sleeve 8 (FIG. 7) to rotate member 7d of valve 7 in a clockwise direction to increase said flow of cooling fluid through valve 7.

It is believed expedient to here point out that valve 7 may, for example, be adjusted by the actuation of or pushing on said right or left hand projections 8c on sleeve 8 (FIG. 7) by an actuator such as disclosed in Letters Patent of the U.S. Pat. No. 3,598,558, issued Aug. 10, 1971 to D. R. Ayers and assigned to the same assignee as the present application. Similarly, plate valve 17 may also be adjusted by the actuation of or pushing on the ends of said actuating rods 27 or 28 by an actuator of the type disclosed in said patent. Other actuating means or types of actuators may, of course, be used for the adjustment of valves 7 and 17 since the specific type of actuating means or actuator employed or the manner in which said valves are adjusted does not, per se, form part of the present invention.

OPERATIONAL EXAMPLE OF THE INVENTION

With further reference to FIG. 1, cooling fluid from a single source thereof is supplied through holes 1b in section 1 of turret machine T and such fluid flows through holes 3b in fluid guide member 3 and then into plenum chamber 3a as previously mentioned and as shown by arrows in FIG. 1. Assuming that the pairs of openings 7f and 7g in valve 7 and 17c and 17d in valve 17 are aligned with each other as shown in FIG. 1 (or are partially aligned with each other) said cooling fluid divides in plenum chamber 3a with part thereof flowing through the pairs of complemental openings 7f-7g and part flowing through the pairs of complemental openings 17c-17d as also shown by arrows in FIG. 1. It is here pointed out that the paths of the cooling fluid through the remainder of the apparatus, or between the parts thereof are also shown by the use of arrows in FIG. 1 to the extent practicable.

The part of the cooling fluid which flows through the pairs of openings such as 7f-7g in valve 7 flows upwardly around the central portion 14b of orifice member or distributor 14, through plenum chamber 14d of member 14 into the lower ends of the orifices such as 14a in the previously discussed upwardly curved portion of member 14, and thence through said orifices to impinge on the lower surface of the aforesaid lower portion of the bowl-shaped part of mold 10 where the cooling fins such as 12 are not provided.

Some of the part of the cooling fluid which flows through the pairs of openings such as 17c-17d in valve 17 flows upwardly through the windows such as 16c in support member 16 and thence through the orifices such as 14a in the portion of baffle or orifice member 14 which is below the outer bowl-shaped portion of mold 10 and adjacent the cooling fins such as 12 to impinge against the outer surface of such bowl-shaped portion and the surfaces of said fins. The other part of the cooling fluid flowing upwardly through the pairs of openings such as 17c and 17d in valve 17 flows outwardly and up around the rim of support member 16 or through the windows such as 16c in such member 16 and thence into the space between enclosure 13 and the cooling fins on the upper part of mold 10 to impinge against those fins and the outer surface of such upper mold part.

From the above descriptions of the paths of flow of the cooling fluid through the parts of the apparatus or apparatus assembly embodying the invention, it will be apparent that basket valve 7 controls cooling of mold 10 adjacent the center of such mold, that is, at and about the part of the mold in which there is formed the somewhat tubular part of a somewhat funnel-shaped glass article formed in mold cavity 11 of mold. That is to say, adjustment of valve 7, in the manner previously described, provides a lesser or greater cooling fluid flow through the pairs of openings such as 7f and 7g in valve 7 and regulates the cooling of the central part of mold 10. Similarly, plate valve 17 controls cooling of mold 10 in the main bowl-shaped part of such mold and adjacent the upper part thereof. That is to say, adjustment of valve 17, in the manner previously discussed, regulates cooling fluid flow through the pairs of openings such as 17c and 17d in valve 17 and controls cooling of the bowl-shaped part of mold 10 and the upper part thereof. Although there is herein shown and described only one form of apparatus embodying the invention, it is to be understood that such is not to be considered in any way limiting but that various changes and modifications may be made therein within the purview of the appended claims without departing from the spirit and scope thereof.

What is claimed is:

1. In combination with a glass forming mold (10) embodying a mold cavity (11) and including a relatively large bowl-shaped upper portion and a lower central tubular portion (10a) and used for forming generally funnel-shaped articles such as, for example, funnel members for glass television picture tube envelopes, an apparatus assembly for distributing, directing and selectively adjusting flow of cooling fluid to and about the outer surface of said mold (10) for selective temperature control thereof during the forming of said articles in said cavity thereof, such apparatus assembly comprising;

A. a first member (13) surrounding said mold (10) adjacent to but spaced from the outer surface of the upper part of said bowl-shaped portion thereof;
   B. a perforated baffle member (14) having orifices (14a) extending generally vertically therethrough and including central portions (14b-14c) providing a cooling fluid plenum chamber (14d) for cooling fluid to be supplied about said lower central tubular portion (10a) of said mold (10) such plenum chamber surrounding such tubular portion (10a) and a main outer plate portion (14f) of said baffle member (14) being positioned below but spaced from the lower portion of said bowl-shaped portion of said mold (10) to distribute cooling fluid over the outer surface of such lower mold portion;
   C. an adjustable basket-type cooling fluid flow control valve 7 below said plenum chamber (14d) and having an inner member (7d) providing for fluid flow communication with such plenum chamber (14d) for supplying cooling fluid thereto, and an outer member (7a);
   D. a generally annular cooling fluid receiving and guide member (3) providing a cooling fluid plenum chamber (3a) generally surrounding said valve (7) for supplying cooling fluid about said outer member (7a) of such valve (7);
   E. an adjustable plate-type cooling fluid flow control valve (17) above said plenum chamber (3a) and having a lower member (17a) in fluid flow communication with such plenum chamber and an upper member (17b) providing for fluid flow communication with the lower ends of said orifices (14a) of said baffle member (14); and F. first and second valve actuating means for adjusting said basket-type and said plate-type valves (7 and 17) respectively, for selectively regulating flow of cooling fluid therethrough and thence to different parts of said mold (10) for selectively controlling the temperature thereof.

2. Apparatus in accordance with claim 1 and further including a multitude of cooling fins (12) on the outer surface of said bowl-shaped portion of said mold (10).

3. Apparatus in accordance with claim 1 and in which said fluid receiving and guide members (3) is located in an upper section (1) of a turret type glass pressing machine (T) for receipt of cooling fluid therefrom.

4. Apparatus in accordance with claim 2 and in which said fluid receiving and guide members (3) is located in an upper section (1) of a turret type glass pressing machine (T) for receipt of cooling fluid therefrom.

5. In combination with a glass forming mold (10) including a generally bowl-shaped upper portion and a lower central tubular portion (10a) and used for forming generally funnel-shaped articles, an apparatus assembly for directing, distributing and selectively controlling flow of cooling fluid about the outer surface of said mold (10) for selective temperature control thereof, such apparatus assembly comprising:

I. a generally annular cooling fluid receiving and guide member (3) embodying an inner annular plenum chamber (3a);

II. first adjustable fluid flow control means (7) having a fluid inlet side (7a) adjacent the inner limits of said plenum chamber (3a) and a fluid outlet side (7d);

III. second adjustable fluid flow control means (17) having a fluid inlet side (17a) above said plenum chamber (3a) and a fluid outlet side (17b);

IV. a perforated baffle member (14) embodying a plurality of relative small orifices (14a) extending generally vertically therethrough and embodying a second plenum chamber (14d) surrounding said tubular portion of said mold (10) and in fluid flow communication with said fluid outlet side (7d) of said first fluid flow control means (7) and a main outer plate portion (14f) disposed below and spaced from the lower portion of said bowl-shaped portion of said mold (10) and in fluid flow communication with said fluid outlet side (17b) of said second fluid flow control means (17); and V. an enclosure member (13) surrounding the upper portion of said bowl-shaped portion of said mold (10) and spaced from the outer surface thereof to provide a fluid flow path leading from the space between said main portion (14f) of said baffle member (14) and said lower portion of said bowl-shaped portion of said mold (10) into the space between the enclosure (13) and said outer surface of said upper portion of said bowl-shaped portion of said mold (10).

6. Apparatus in accordance with claim 5 and further including a multitude of cooling fins (12) on said outer surface of said mold (10) to aid in cooling thereof.

7. Apparatus in accordance with claim 5 and in which said cooling fluid and receiving guide member (3) is supported in an upper section (1) of a turret-type glass pressing machine (T) for receipt of cooling fluid therefrom.

8. Apparatus in accordance with claim 6 and in which said cooling fluid and receiving guide member (3) is supported in an upper section (1) of a turret-type glass pressing machine (T) for receipt of cooling fluid therefrom.

* * * * *

UNITED STATES PATENT AND TRADEMARK OFFICE
CERTIFICATE OF CORRECTION

PATENT NO. : 4,032,317
DATED : June 28, 1977
INVENTOR(S) : Arieh Carmi, Richard A. Potter & Alan G. Ryder It is certified that error appears in the above-identified patent and that said Letters Patent are hereby corrected as shown below:

Column 1, line 46, "somewhat isometric" should read --somewhat schematic isometric--; Column 2, line 19, "is section" should read --in section--; Column 4, line 17, "lowered" should read --lower--; Column 6, line 17, "pins are" should read --pins and are--; Column 6, line 56, delete "liquid" and insert --fluid--; Column 6, line 62, after "sleeve" insert --8--; Column 8, line 16, after "thereof." start a new paragraph with --Although--; Column 8, claim 1, line 67, after "(14a)", insert --in said main outer portion (14f)--; Column 9, claim 4, line 18, "members" should read --member--.

Signed and Sealed this

Twenty-seventh Day of December 1977

[SEAL]

Attest:

RUTH C. MASON
*Attesting Officer*

LUTRELLE F. PARKER
*Acting Commissioner of Patents and Trademarks*